(12) United States Patent
Drennen et al.

(10) Patent No.: US 6,668,983 B2
(45) Date of Patent: Dec. 30, 2003

(54) WHEEL BRAKE CALIPER WITH INTEGRAL BRAKE PAD TORQUE SENSING

(75) Inventors: David B. Drennen, Bellbrook, OH (US); Michael C. Pfeil, S. Charleston, OH (US); John E. Pozenel, Dayton, OH (US); Gary C. Fulks, Dayton, OH (US); Harald Klode, Centerville, OH (US); Douglas E. Poole, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 65 days.

(21) Appl. No.: 10/024,671

(22) Filed: Dec. 18, 2001

(65) Prior Publication Data

US 2003/0111305 A1 Jun. 19, 2003

(51) Int. Cl.[7] .................................................. B60T 8/72
(52) U.S. Cl. .................................... 188/181 T; 188/346
(58) Field of Search .............................. 188/73.44, 346, 188/1.11 E, 181 T, 73.42, 73.43; 303/112

(56) References Cited

U.S. PATENT DOCUMENTS

| | | | |
|---|---|---|---|
| 4,666,021 A | * | 5/1987 | Messersmith ............ 188/181 T |
| 5,279,394 A | * | 1/1994 | Wollenweber et al. ... 188/181 T |
| 5,456,524 A | * | 10/1995 | Kashima et al. ............. 188/346 |
| 5,632,359 A | | 5/1997 | Camps et al. |
| 5,785,156 A | | 7/1998 | Warwick et al. |
| 6,006,597 A | | 12/1999 | Miyazaki |
| 6,139,460 A | | 10/2000 | Drennen et al. |

* cited by examiner

Primary Examiner—Christopher P. Schwartz
Assistant Examiner—Melanie Torres
(74) Attorney, Agent, or Firm—Scott A. McBain

(57) ABSTRACT

A torque sensing apparatus for use with a brake caliper having opposing brake pads positioned on opposite sides of a rotor. The brake caliper causes the brake pads to apply a braking force against the rotor that generates a braking torque. A torque transfer device is supported by the brake caliper and is in contact with one of the brake pads. The torque transfer device is resiliently movable with respect to the brake caliper in response to the braking torque. A torque sensor is positioned in a sensing relationship relative to the torque transfer device. Thus, the torque sensor provides an output signal related to a change of position of the torque transfer device and the braking torque. The torque sensor includes a magnet mounted on the torque transfer device and a magnet field sensor, for example, a Hall Effect sensor, is mounted on the brake caliper.

24 Claims, 5 Drawing Sheets

WHEEL BRAKE CALIPER WITH INTEGRAL BRAKE PAD TORQUE SENSING

FIELD OF THE INVENTION

The present invention relates to a brake caliper for an automotive wheel brake system, and in particular, to a brake caliper with an improved brake force sensing.

BACKGROUND OF THE INVENTION

Automotive wheel disk brakes rely upon the friction of opposing brake pads gripping a disk or rotor to slow a vehicle such as a car or truck. More particularly, a brake caliper supports opposing brake pads on opposite sides of the rotor. In operation, the caliper moves the pads together and squeezes the rotor therebetween. The rotor is connected to and rotates with a wheel of the vehicle. Thus, using the brake pads to squeeze the rotor slows the rotation of the rotor and vehicle wheel and hence, the speed of the vehicle itself. The resulting braking action depends on many factors, for example, the speed of the vehicle and hence, the angular velocity of the rotor, the condition of the rotor, the type and condition of the brake pads, ambient environmental conditions, for example, temperature, moisture, etc., and the magnitude of the force applied to the brake pads.

It is desirable to control braking forces in order to obtain optimal performance and reliability of the brake system. Excessive braking forces cause a build-up of heat that can damage the brake components and impair effective braking. In addition, excessive braking forces can cause a tire skid, especially when the tire is on a slippery road surface. However, in some circumstances, it is undesirable to reduce the braking forces, for example, where a shorter stopping distance is desired.

Conventional braking systems optimize braking forces in different braking situations, for example, to predict/prevent skidding, by monitoring indirect vehicle braking parameters, such as the rotational speed of the wheel and/or rotor. However, monitoring the wheel/rotor rotational speeds to detect a rapid slowing indicative of an impending tire skid avoids only one potential problem associated with excessive braking.

Another indirect vehicle braking parameter often monitored is the amount of hydraulic or electric power delivered to the brake caliper during a braking event. However, the pressure applied by the caliper against the brake pads to squeeze the rotor is only one factor affecting the resulting braking action. The braking system has many opportunities for the brake-actuating force to be diverted or reduced before a braking force is realized. More specifically, the braking action is a torque in a direction that is generally perpendicular to the caliper-generated, brake-actuating force applied to the brake pads. The braking torque produced by a particular brake-actuating force varies as a function of the coefficient of friction between the pads, that, in turn, is dependent on the aforementioned conditions. In addition, the available braking torque from a brake-actuating force is also impeded by internal friction of components of the brake caliper itself that diminish the effective brake-actuating force. Therefore, monitoring the power delivered to the brake caliper is not a particularly accurate measurement of the braking forces realized at the rotor. Rather, a measurement of the torque forces at the rotor and pads would be a better indicator of the effectiveness of a brake-generating force.

It is known to provide a system in which torsional stress produced by the brakes is indirectly sensed by a strain gauge placed in the axle of the vehicle rather than integral to the brake caliper. Such a system, however, has various drawbacks. Special considerations are required to specifically orient the sensor in the axle in order to measure torsional stress. Such an orientation requires a hole through the axle which is aligned at or about a brake caliper angle. This may be difficult to achieve. In addition, the axle is subject to a number of structural loads that complicate the signal conditioning from the strain gauge.

Therefore, a direct measurement of braking torque is desirable, but is not conventionally known or used in vehicle wheel braking systems.

SUMMARY OF THE INVENTION

The present invention provides an improved braking system. The braking system of the present invention is able to consistently and reliably determine the braking torque at the rotor disk. The braking system of the present invention is especially beneficial in providing a more precise control over how each wheel of a vehicle is braked; and thus, the braking system of the present invention provides improved vehicle control and stability under many adverse braking conditions.

According to the principles of the present invention and in accordance with the described embodiments, the invention provides an apparatus for use with a brake caliper having opposing brake pads positioned on opposite sides of a rotor. The brake caliper causes the brake pads to apply a braking force against the rotor that generates a braking torque. A torque transfer device is supported by the brake caliper and is in contact with one of the brake pads. The torque transfer device is movable with respect to the brake caliper in response to the braking torque, and a torque sensor is positioned in a sensing relationship relative to the torque transfer device. Thus, the torque sensor provides an output signal related to a change of position of the torque transfer device and the braking torque.

In one aspect of this invention, the torque transfer device is resiliently movable with respect to the brake caliper. In a further aspect of this invention, the torque sensor includes a magnet mounted on the torque transfer device and a magnet field sensor, for example, a Hall Effect sensor, is mounted on the brake caliper.

In another embodiment of the invention a method is provided for sensing a braking torque generated by a brake caliper forcing opposed brake pads against opposite sides of a rotor. The braking torque is opposed with a member in contact with a brake pad and movable relative to the brake caliper. A change in position of the member is sensed, and that change in position is related to a magnitude of the brake torque.

In one aspect of this invention, a change in a magnetic field caused by a change in position of the member is sensed by a magnetic field sensor, for example, a Hall Effect sensor. Further, an output signal is provided representing a change in the magnetic field and related to the braking torque.

These and other objects and advantages of the present invention will become more readily apparent during the following detailed description taken in conjunction with the drawings herein

BRIEF DESCRIPTION OF THE DRAWING

The accompanying drawings, which are incorporated in and constitute a part of this specification, illustrate embodiments of the invention.

DETAILED DESCRIPTION OF SPECIFIC EMBODIMENTS

Figure 1:
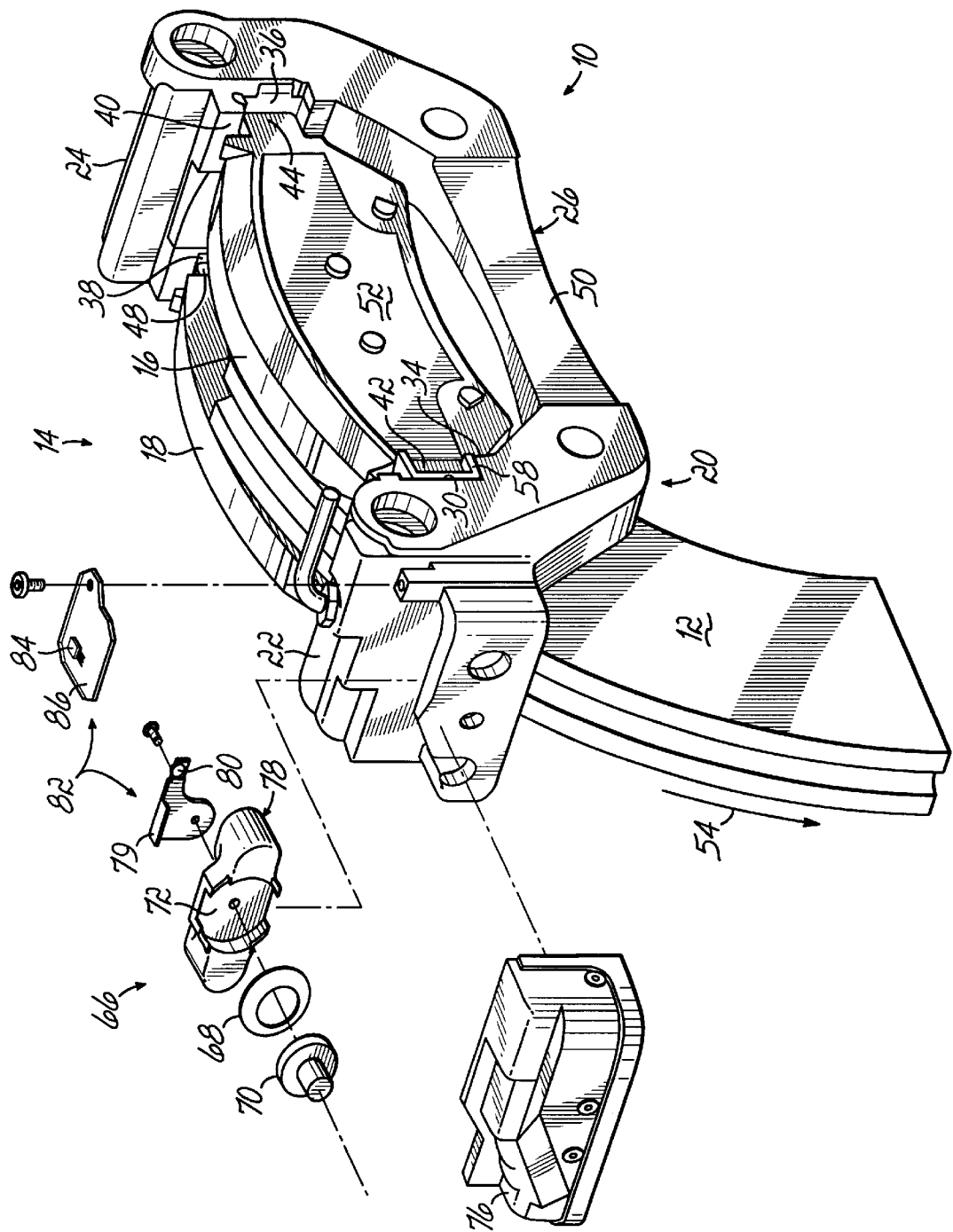
FIG. 1 is an exploded perspective view of a torque sensor integral to a wheel brake caliper in accordance with the principles of the present invention.

Referring to FIG. 1, a brake caliper 10 is mounted on a disk or rotor 12 of a wheel brake system 14 suitable in applications such as in an automotive vehicle. The brake caliper 10 provides an opportunity to more directly sense braking torque, thereby avoiding approximations of braking torque provided by known techniques for the indirect sensing of braking torque. With a more accurate measurement of brake torque, the brake system 14 more accurately determines proper slip for minimizing stopping distance. The brake caliper 10 produces a braking torque with two opposing brake pads, depicted as an inboard brake pad 16 and outboard brake pad 18, that are positioned on opposite sides of the rotor 12. A fixed or stationary member 20 of the brake caliper 10 is positioned proximate to but not contacting the rotor 12 and holds the pads 16, 18.

The fixed member 20 includes a forward bridge 22 and a rear bridge 24 that each span the outer circumference of the rotor 12 from inboard to outboard. The bridges 22, 24 are connected to each other on opposite sides of the rotor 12 by an inboard bracket 26 and an outboard bracket (not shown). An inboard forward channel 30 and an outboard forward channel 32 (FIG. 2) are formed on opposite sides of the rotor 12 and aligned with each other in a rearward facing surface 34 of the forward bridge 22. An inboard rear channel 36 and an outboard rear channel 38 are formed on opposite sides of the rotor 12 and aligned with each other in a forward facing surface 40 of the rear bridge. The forward channels 30 are parallel with the rear channels 36, 38 for guiding the inward movement of the brake pads 16, 18. Specifically, a forward tab 42 of the inboard brake pad 16 slides in the inboard forward channel 30 and a rear tab 44 of the inboard brake pad 16 slides in the inboard rear channel 36. A forward tab 46 (FIG. 2) of the outboard brake pad 18 slides in the outboard forward channel and a rear tab 48 of the outboard brake pad 18 slides in the outboard rear channel 38.

Figure 2:
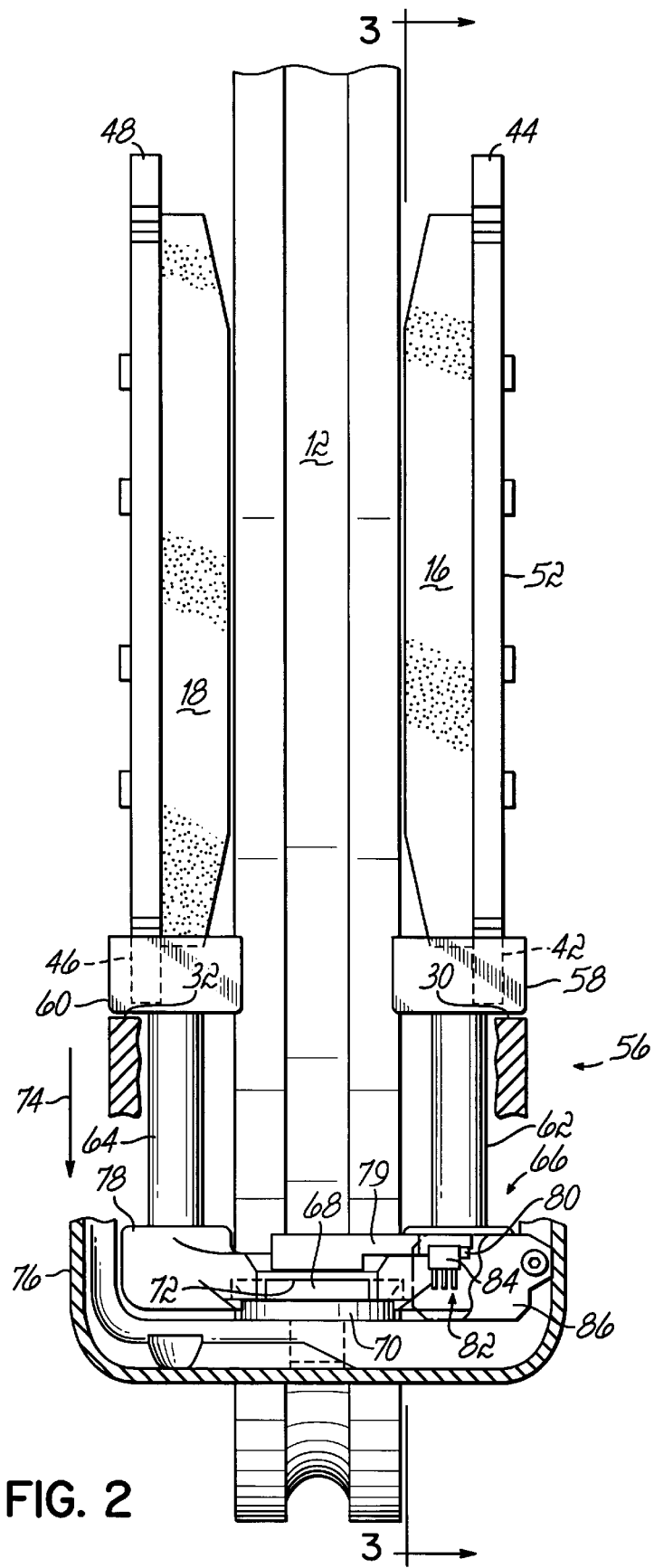
FIG. 2 is a top elevational view of the brake caliper of FIG. 1 depicting torque transfer devices and the torque sensor.

Referring to FIG. 2, the brake pads 16, 18 are urged toward one another in a known manner by a movable piston or rod (not shown) of a hydraulic, electro-hydraulic or electromechanical actuator (not shown). The actuator is attached with sliding pins to an inboard surface 50 of the fixed member 20. The movable piston of the actuator is extended in an outboard direction against a contact area 52 of the inboard brake pad 16. As the piston of the actuator extends, the inboard brake pad 16 is directly urged outboard into frictional contact with the rotor 12. Since the actuator is attached to the fixed member 20, the outboard brake pad 18 is urged inboard into frictional contact with the rotor 12.

Referring to FIG. 1, the rotor 12 rotates as depicted by a counter clockwise arrow 54 during forward movement of the vehicle. As the brake pads 16, 18 frictionally contact the rotor 12, the rotation of the rotor 12 slows, a braking torque is created, that is, a frictional force between the pads 16, 18 and the rotor 12 occurring at a radius from the center of the rotor 12. Referring to FIG. 2, that braking torque is applied by the respective forward tabs 42, 46 of the brake pads 16, 18 against a resilient torque transfer device 56. In particular, relative movement of the torque transfer device 56 with respect to the fixed member 20 is indicative of a magnitude of the braking torque. The torque transfer device 56 receives braking torque from both brake pads 16, 18 via inboard and outboard U-shoes 58, 60 that reside in the forward channels 30, 36, respectively. The U-shoes 58, 60 are spaced away from their respective channels 30, 32; and the spacing decreases as the braking torque increases.

The braking torque is respectively transferred from each U-shoe 58, 60 by respective inboard and outboard force transfer pins 62, 64 to a sensor nest assembly 66 mounted on the forward side of the fixed member 20 (FIG. 1). The braking torque is then transferred to a spring member, depicted as a spring washer 68 and to an anvil 70 that abuts and is received by the fixed member 20. Referring to FIG. 1, the spring washer 68 is contained within a recess 72 in a nest 78 and is located between the sensor nest assembly 66 and anvil 70. Referring to FIG. 2, the spring washer 68 compresses as the braking torque increases, thereby allowing the torque transfer device 56 to move forward, as depicted by arrow 74.

Figure 3:
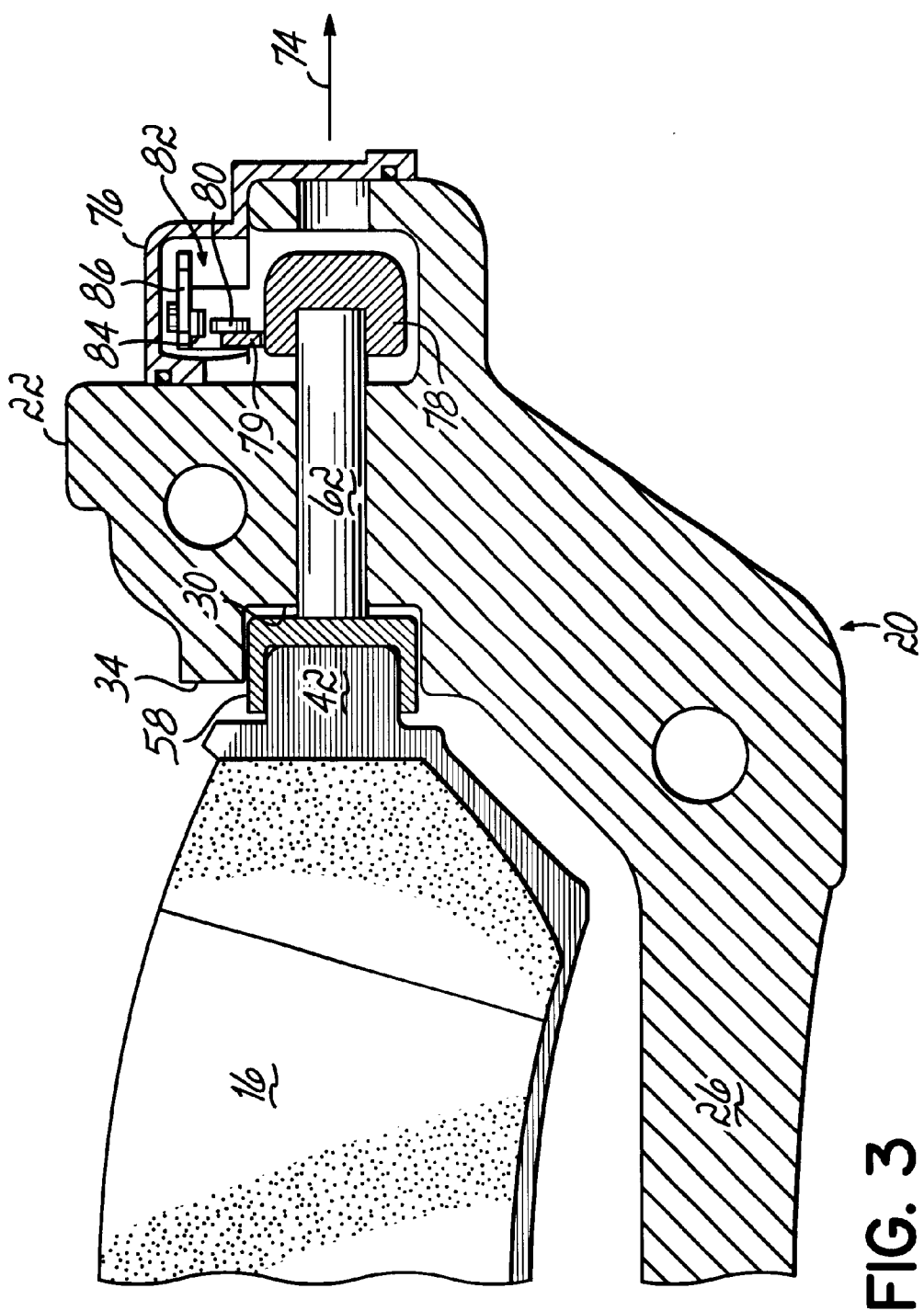
FIG. 3 is a partially broken cross-sectional view along line 3—3 of FIG. 2 depicting the inboard torque transfer device and the torque sensor.

A noncontact torque sensor 82 includes a plate 79 with a noncontact sensor target, for example, a rare earth magnet 80. The noncontact torque sensor 82 also includes a magnetic field transducer or sensor 84, for example, a Hall Effect transducer 84, affixed to a printed circuit board (PCB) 86. The transducer 84 is connected to the fixed member 20 via the PCB 86 and senses changes in the magnetic field from the magnet 80. As shown in FIG. 3, the magnet 80 is located below the Hall Effect sensor 84. Therefore, as the braking torque is applied by the pad tab 42, the U-shoe 58, transfer pin 62, nest 78 and magnet 80 translate through a small displacement in the forward direction, that is, to the right as viewed in FIG. 3. That small displacement of the magnet 80 is detectable by the Hall Effect sensor 84. As the braking torque diminishes, the U-shoe 58, transfer pin 62, nest 78 and magnet 80 are translated rearward by the spring member 68 (FIG. 1).

Figure 2A:
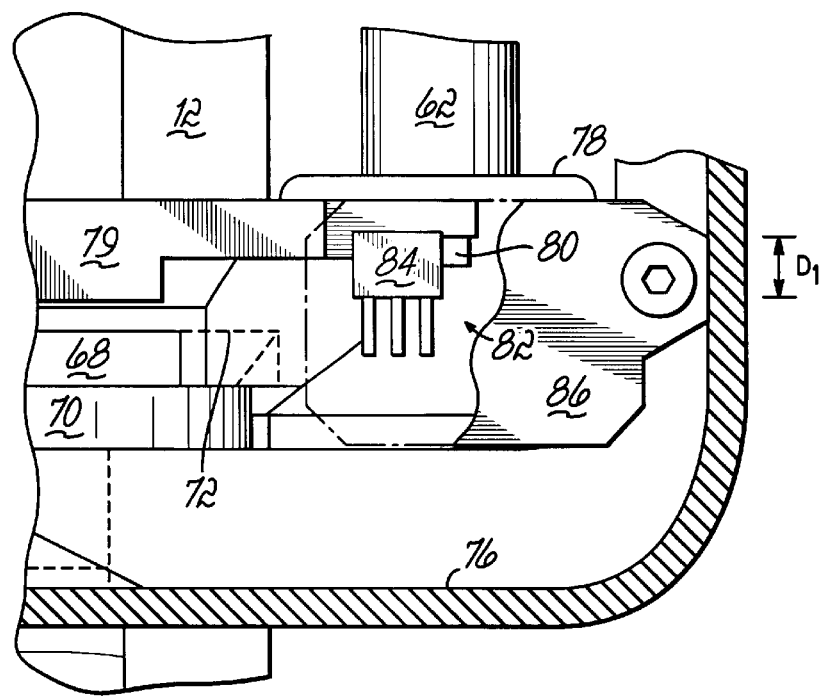
FIG. 2A is a detailed view of the torque sensor of FIG. 2 shown in a low torque condition.
Figure 2B:
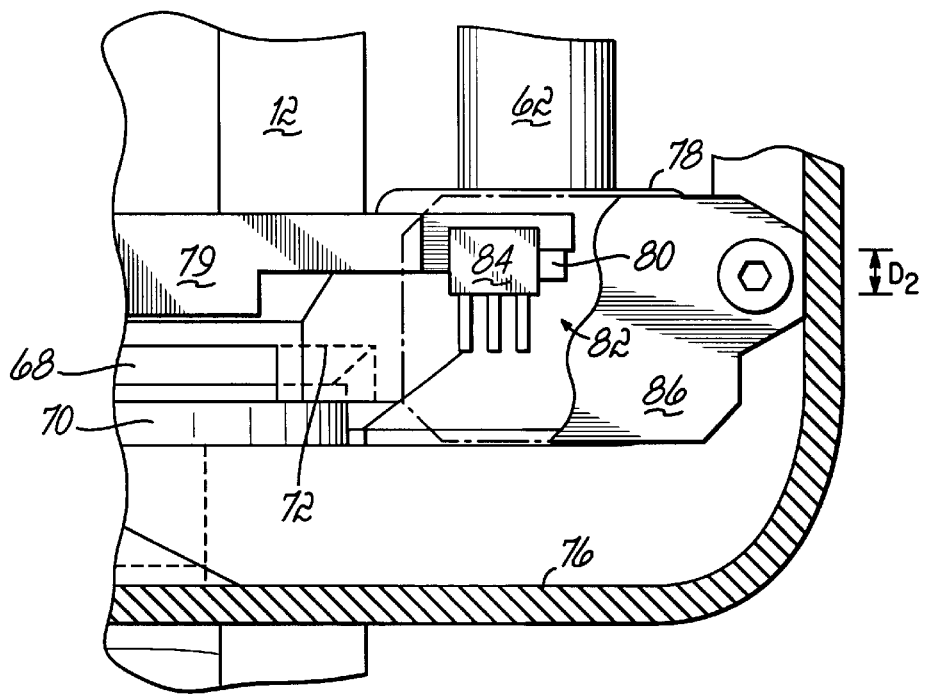
FIG. 2B is a detailed view of the torque sensor of FIG. 2 shown in a high torque condition.

Referring to FIGS. 2A and 2B, the movement of the magnet 80 with respect to the transducer 84 is more specifically illustrated. In FIG. 2A, with little or no braking torque, the spring washer 68 is expanded; and the magnet 80 is displaced rearward to a location that is displaced a distance D1 from a reference point with respect to the transducer 84. FIG. 2B illustrates the application of more braking torque that compresses the spring washer 68 and displaces the magnet 80 forward to a location that is displaced a distance D2 from a reference point with respect to the transducer 84. An output signal from the transducer 84 varies in relation to the displacement of the magnet 80 in moving between the locations represented by the distances D1 and D2.

Figure 4:
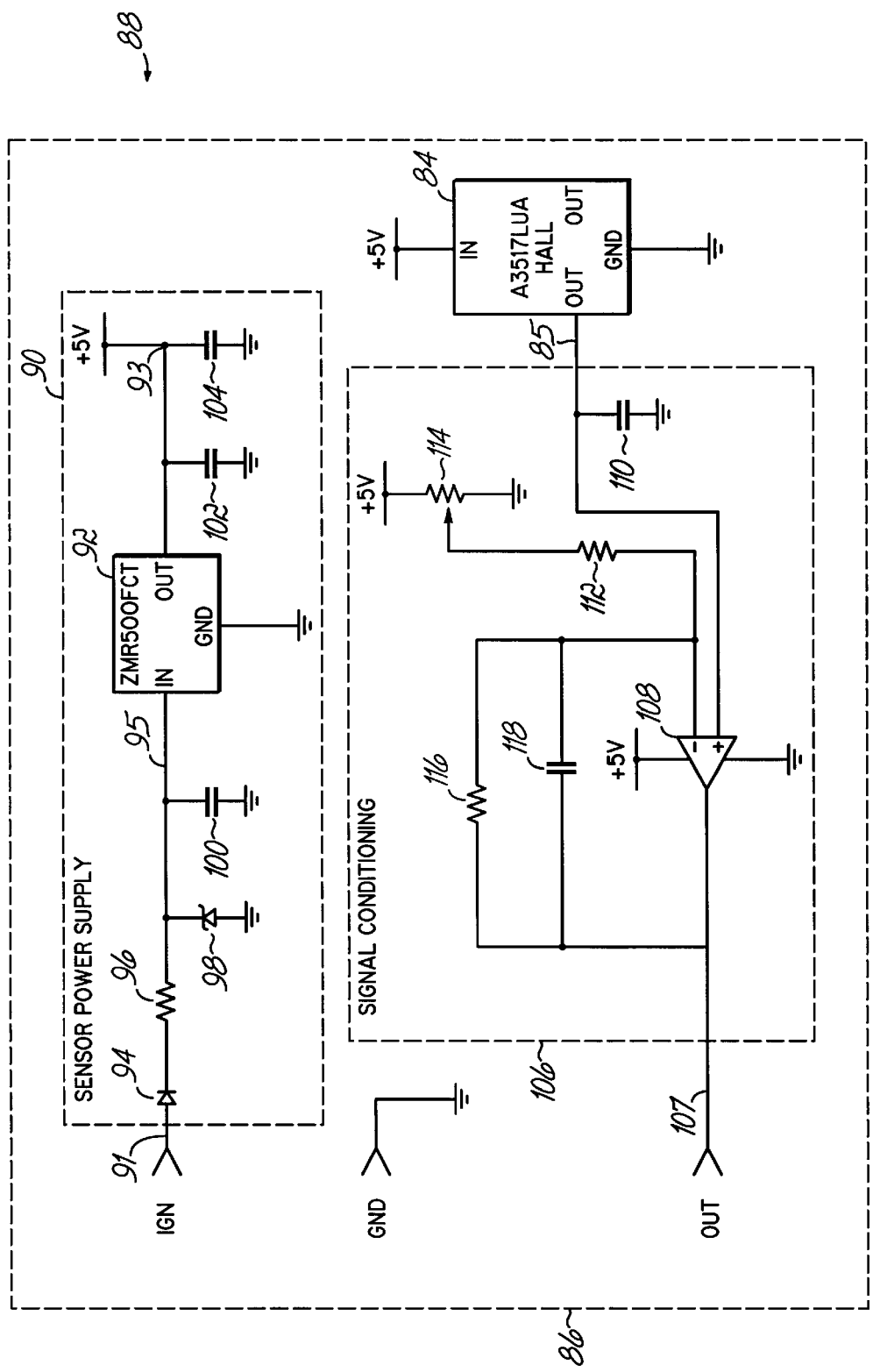
FIG. 4 is a circuit diagram of the torque sensor of FIGS. 1–3.

Referring to FIG. 4, the sensor 84 is part of sensor circuitry 88 that also has a power supply 90 and signal conditioning circuitry 106. The sensor 84 is a Hall Effect sensor that provides a linear, analog sensor signal on output 85 that changes proportionally to changes in the magnetic field of the magnet 80. In other words, the sensor signal on output 85 changes proportionally with changes in the position of the magnet 80. The sensor signal is provided to signal conditioning circuitry 106, and a conditioned sensor signal is provided on an output 107 of the sensor circuitry 88. The conditioned sensor signal is used by a brake control (not shown) in the wheel brake system 14.

The sensor power supply 90 converts a 12 VDC ignition voltage on an input 91 to a 5 VDC on an output 93 required by a commercially available Hall Effect sensor 84. The sensor power supply 90 has a voltage regulator 92. The commercially available voltage regulator 94 is configured to protect the sensor circuitry 88 from over-voltage, reverse voltage, and electrical transients on the ignition line. Specifically, a series combination of a forward directed signal diode 94 and a 50Ω resister 96 couples the input 91 to an input 95 of the voltage regulator 92. A Zener diode 98 and a 0.1 $\mu$F capacitor 100 provide the desired protection for the voltage regulator input 95. The voltage regulator output 93 is protected by a parallel combination of filtering capacitors, for example, a 0.1 $\mu$F capacitor 102 and a 1 $\mu$F capacitor 104.

The Hall Effect transducer 84 provides a sensor signal on an output 85, and the sensor signal is amplified and low pass filtered for noise by the signal conditioner 106. In particular, a differential op-amp 108 has a non-inserted input coupled to the transducer output 85 that is filtered with a 0.01 $\mu$F capacitor 110. An inverting input of the op-amp 108 is coupled via a 33 $\mu$Ω resistor 112 to a potentiometer 114 biased between the regulated +5V and ground. Adjusting the potentiometer 114 adjusts an output bias on the conditioned sensor signal on the output 107. Feedback for the op-amp 108 between inverting and output terminals is provided by a parallel combination of 220 $\mu$Ω resistor 116 and a 0.1 $\mu$F capacitor 118.

While the present invention has been illustrated by a description of one embodiment and while that embodiments has been described in considerable detail, it is not the intention of the applicants to restrict or in any way limit the scope of the appended claims to such detail. Additional advantages and modifications will readily appear to those skilled in the art. For example, in the described embodiment, the braking torque from both brake pads 16, 18 is sensed. As will be appreciated, in another embodiment, the braking torque from only one of the pads 16, 18 can be sensed. Further, in the described embodiment, the noncontact sensor 82 is separated from the extreme environment of the brake pads 16, 18. In alternative embodiments, a torque sensing transducer may be located closer to the brake pads 16, 18, thereby providing a more direct sensing capability. In the described embodiment, the magnet 80 is mounted on the torque transfer device 56 and the torque sensor 84 is mounted on the brake caliper 10. As will be appreciated, in an alternative embodiment, the magnet 80 can be mounted on the brake caliper 10, and the torque sensor 84 can be mounted on the torque transfer device 56.

The invention in its broader aspects is, therefore, not limited to the specific details, representative apparatus and method, and illustrative examples shown and described. Accordingly, departures may be made from such details without departing from the spirit or scope of applicant's general inventive concept.

What is claimed is:

1. An apparatus for use with a brake caliper having opposing brake pads positioned on opposite sides of a rotor, the brake caliper causing the brake pads to apply a braking force against the rotor that generates a braking torque, the apparatus comprising:

a torque transfer device adapted to be supported by the brake caliper and in mechanical communication with one of the brake pads, the torque transfer device being movable with respect to the brake caliper in response to the braking torque; and a torque sensor comprising a magnet positioned in a sensing relationship relative to the torque transfer device.

2. The apparatus of claim 1 further comprising a spring member disposed between the torque transfer device and the brake caliper, the torque transfer device being resiliently movable with respect to the brake caliper.

3. The apparatus of claim 1 wherein the torque sensor is generates a sensor signal in response to a change in position of the torque transfer device relative to the torque sensor.

4. The apparatus of claim 3 wherein the torque sensor is disposed adjacent to but not in contact with the torque transfer device.

5. The apparatus of claim 4 wherein the magnet is movable with respect to the brake caliper in response to the braking torque.

6. The apparatus of claim 5 wherein the torque transfer device further comprises a torque transfer pin in mechanical communication with the magnet and movable with respect to the brake caliper In response to the braking torque.

7. The apparatus of claim 6 wherein one end of the torque transfer pin is in mechanical communication with the one of the brake pads and an opposite end of the torque transfer pin supports the magnet.

8. The apparatus of claim 5 wherein the torque sensor further comprises a magnetic field sensor adapted to be mounted on the brake caliper at a location permitting the magnetic field sensor to detect changes in a magnetic field of the magnet in response to a change of position of the magnet.

9. The apparatus of claim 8 wherein the magnetic field sensor comprises a Hall Effect sensor.

10. The apparatus of claim 1 wherein the torque transfer device is in mechanical communication with each of the brake pads.

11. The apparatus of claim 10 wherein the torque transfer device comprises a pair of torque transfer pins, one end of each of the torque transfer pins is in mechanical communication with the one of the brake pads and opposite ends of each of the torque transfer pins are connected together and provide a support for the magnet.

12. An apparatus for use with a brake caliper having opposing brake pads positioned on opposite sides of a rotor, the brake caliper causing the brake pads to apply a braking force against the rotor that generates a braking torque, the apparatus comprising:

a torque transfer device adapted to be supported by the brake caliper and in mechanical communication with one of the brake pads, the torque transfer device being movable with respect to the brake caliper in response to the braking torque; and a torque sensor comprising a magnet adapted to be mounted on the brake caliper, and a magnetic sensor mounted on the torque transfer device in a sensing relationship with the magnet, the torque sensor operable to generate a sensor signal in response to a change in position of the torque transfer device and torque sensor relative to the magnet.

13. A brake caliper for use with a rotor comprising:

a channel on one side of the rotor;

opposing brake pads adapted to be positioned on opposite sides of the rotor, one of the brake pads being movable toward an other of the brake pads by sliding in the channel, and the brake pads being movable to apply a braking force against the rotor and generating a braking torque;

a torque transfer device adapted to be resiliently supported by the brake caliper and in mechanical communication with one of the brake pads, the torque transfer device being movable with respect to the brake caliper in response to the braking torque, the torque transfer device comprising a channel member in the channel in sliding contact with the one of the brake pads.

a torque transfer member connected to the channel member, and a spring member positioned between the brake caliper and the torque transfer member; and a torque sensor mounted in a sensing relationship with the torque transfer device, the torque sensor generating a sensor signal in response to a change in position of the torque transfer device.

14. The brake caliper of claim 13 further comprising a spring member disposed between the torque transfer device and the brake caliper.

15. The brake caliper of claim 13 wherein the brake caliper has a second channel on an opposite side of the rotor, and the other of the brake pads is movable toward the one of the brake pads by sliding in the second channel, and the torque transfer device comprises:

a second channel member in the second channel in sliding contact with the other of the brake pads; and a second torque transfer member connected to the second channel member, the spring member being positioned between the second torque transfer member and the brake caliper.

16. The apparatus of claim 15 wherein the torque sensor further comprises:

a magnet mounted on the torque transfer device and movable with respect to the brake caliper in response to the braking torque; and a magnetic field sensor mounted at a location permitting the magnetic field sensor to detect a change in a magnetic field of the magnet in response to a change of position of the magnet.

17. The apparatus of claim 16 wherein the magnetic field sensor is a Hall Effect sensor.

18. A brake caliper for use with a rotor comprising:

opposing brake pads adapted to be positioned on opposite sides of the rotor, the brake pads applying a braking force against the rotor and generating a braking torque;

a torque transfer device adapted to be supported by the brake caliper and in mechanical communication with one of the brake pads, the torque transfer device being movable with respect to the brake caliper in response to the braking torque; and a torque sensor comprising a magnet adapted to be mounted on the brake caliper and a magnetic field sensor mounted on the torque transfer device in a sensing relationship with the magnet, the torque sensor operable to generate a sensor signal in response to a change in position of the torque transfer device and torque sensor relative to the magnet.

19. The brake caliper of claim 18 further comprising a spring member disposed between the torque transfer device and the brake caliper.

20. A braking system comprising:

a rotor;

opposing brake pads adapted to be positioned on opposite sides of the rotor, the brake pads applying a braking force against the rotor and generating a braking torque;

a torque transfer device adapted to be resiliently supported by the brake caliper and in mechanical communication with one of the brake pads, the torque transfer device being movable with respect to the brake caliper in response to the braking torque; and a torque sensor mounted in a sensing relationship with the torque transfer device, the torque sensor operable to generate a sensor signal in response to a change in position of the torque transfer device, wherein the torque sensor comprises:

a magnet mounted on the torque transfer device and movable with respect to the brake caliper in response to the braking torque; and a magnetic field sensor mounted at a location permitting the magnetic field sensor to detect a change in a magnetic field of the magnet in response to a change of position of the magnet.

21. The apparatus of claim 20 wherein the magnetic field sensor is a Hall Effect sensor.

22. A method of sensing a braking torque generated by a brake caliper forcing opposed brake pads against opposite sides of a rotor, the method comprising:

opposing the braking torque with a member in mechanical communication with a brake pad and movable relative to the brake caliper;

sensing a change in position of the member, the change in position of the member being related to a magnitude of the brake torque; and sensing a change in a magnetic field caused by a change in position of the member.

23. The method of claim 22 further comprising sensing the change in the magnetic field with a Hall Effect sensor.

24. The method of claim 22 providing an output signal representing a change in the magnetic field and related to the braking torque.

* * * * *